3,120,946
CARGO TIEDOWN AND LOCKING DEVICE
Mark E. McCormack, Southboro, and Fred M. Milos, Acushnet, Mass., assignors to the United States of America as represented by the Secretary of the Army
Filed Nov. 13, 1961, Ser. No. 152,108
2 Claims. (Cl. 254—79)
(Granted under Title 35, U.S. Code (1952), sec. 266)

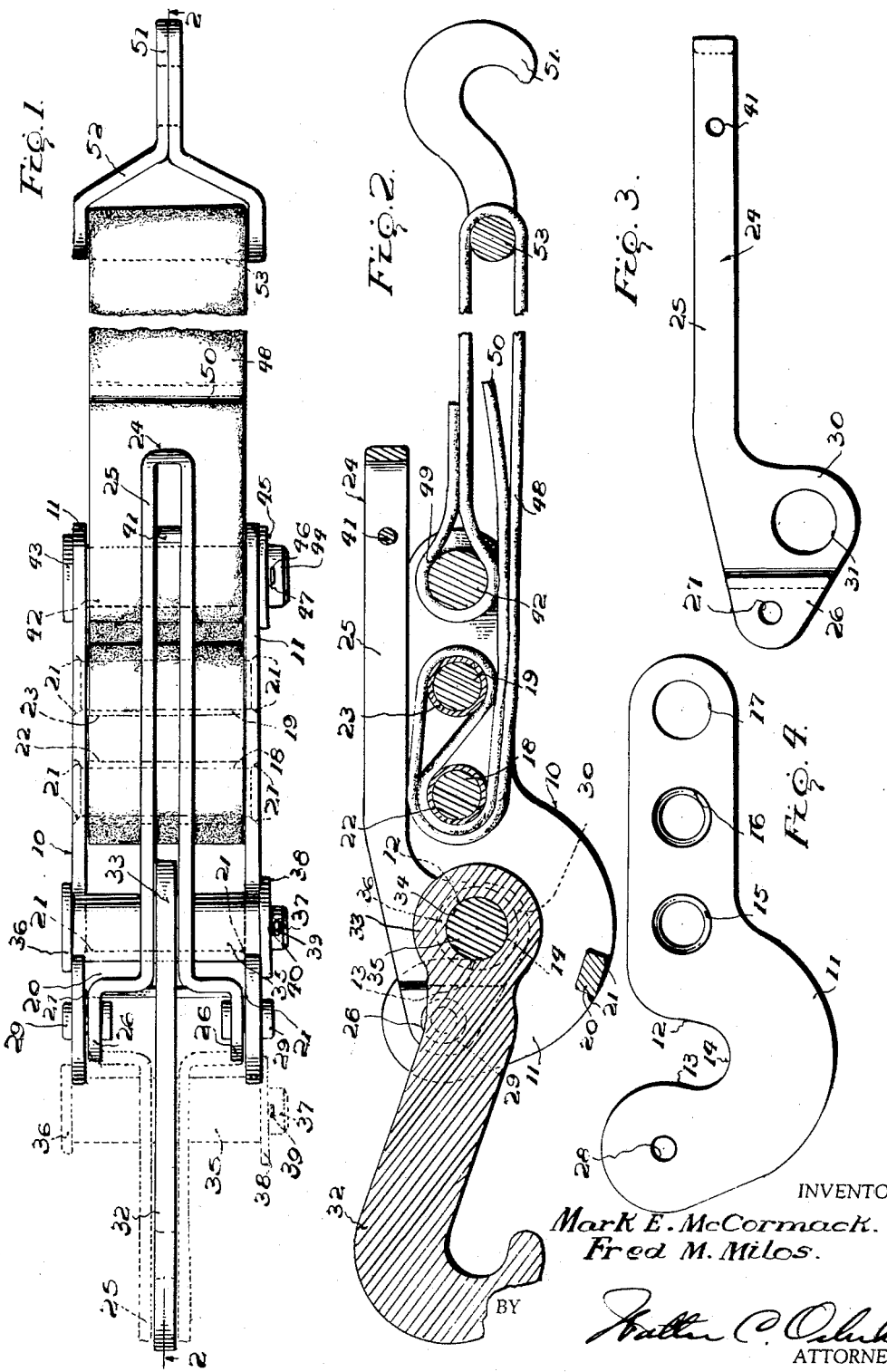

The invention described herein, if patented, may be manufactured and used by or for the Government for governmental purposes, without the payment to us of any royalty thereon.

Our invention relates to cargo tiedown and locking devices.

It is an object of our invention to provide a tiedown and locking device to secure cargo to platforms during transportation and especially during aerial delivery from an aircraft.

Another object of our invention is to provide a device capable of securing a 10,000 lb. load to an aerial delivery platform.

A further object of our invention is to provide a tiedown and locking device which includes separate slack take-up means.

Other objects and advantages of our invention will be apparent during the course of the following description.

In the accompanying drawing forming a part of this application, and in which like numerals are employed to designate like parts throughout the same:

FIGURE 1 is a top plan view of our tiedown and locking device;

FIGURE 2 is a sectional view taken on line 2—2 of FIGURE 1;

FIGURE 3 is a side elevational view of the handle; and

FIGURE 4 is a side elevational view of one of the two identical body portions of our device.

In the drawing wherein for the purpose of illustration is shown a preferred embodiment of our invention, the numeral 10 indicates generally the body portion of our device which is composed of two identical opposed side plates 11 each having cutout a portion 12 providing a cam surface 13 and a seat 14 at the forward end and having openings 15, 16, 17 in the rear portion. The side plates 11, are held in spaced relationship by pins 18 and 19 which extend through the openings 15 and 16 and the spacer bar 20. The pins 18, 19 and spacer bar 20 are secured by any suitable means such as by welding indicated at 21. Sleeves 22 and 23 are carried by the pins 18 and 19.

A handle generally indicated by the numeral 24 comprises a narrow U-shaped gripping portion 25 and a relatively wide forked forward end 26. Holes 27 and 28 are provided in each prong of the forked forward end 26 and in the side plates 11 to receive rivets 29 or other suitable fastening means to permit pivotal movement of the handle 24. The gripping portion 25 terminates adjacent the forked forward end 26 in an enlarged portion 30 having a hole 31 therein.

The hook 32 has a rear portion 33 providing a hole 34 and is secured in the enlarged portion 30 by a removable load pin 35 which extends through the holes 31 in handle 24 and the hole 34 in the hook 32. The pin 35 rotates over the cam surfaces 13 when the handle 24 is moved rearward to the closed locking position.

The pin 35 includes an oversized head 36 and a reduced portion 37. A washer 38 is secured to the reduced portion 37 by any suitable means such as a cotter pin 39 which extends through an opening 40 in the reduced portion 37. A cross-bar 41 bridges the U-shaped gripping portion 25 at the rear portion thereof to prevent the handle 24 from swinging over the hook 32 when the handle 24 is in the open forward position.

A second removable pin 42 having an enlarged head 43 and a reduced portion 44 extends through the openings 17 in the side plates 11. A washer 45 is disposed on the reduced portion 44 and is secured thereto by any suitable means such as the cotter pin 46 which extends through the opening 47.

A webbing 48 is attached to the removable pin 42 by means of a stitched loop 49. The free end 50 of the webbing 48 is doubled back over the sleeves 22, 23 of the pins 18 and 19, to provide a slack take up means as well as a friction lock for the webbing 48 (see FIGURE 2).

If desired, a second hook 51 having a yoke 52 and a connecting bar 53 may be employed in the manner shown in FIGURE 2.

In operation, the handle 24 is moved to the forward open position as partially shown in broken lines in FIGURE 1 to extend the hook 32 in its forwardmost position. The hook 32 is then attached to the platform clevis (not shown) and the webbing 48 is attached to the load (not shown) either by utilizing the conventional webbing strap (not shown) which secures the load to the platform in which case the free end of such webbing would be threaded over the rotatable sleeves 22 and 23 and secured to the removable pin 42 or the rear hook 51 may be fastened to the webbing strap.

The free end 50 of the webbing 48 is pulled over the rotatable sleeves 22 and 23 to take up the slack. This also provides a friction lock for the webbing 48 when the slack has been taken up. The handle 24 is then moved rearwardly to a closed position. During this operation the hook is retracted and the load pin 35 is rotated over the cam surfaces 13 and is locked in the seats 14. It will be noted that the load pin 35 passes over the pivotal rivets 29 which secure the handle 24 to the forked forward end 26 to a locking position located below the plane of said pivotal connection. In this manner no load is applied to the handle or the pivot points. When the pin 35 is in the closed position, a portion of the head 36 engages the outer surface of the cutout portion 12 in one of the side members 11 while a portion of the washer 38 engages the outer surface of the cutout portion 12 in the other side member 11 to prevent lateral movement of the pin 35.

It is to be understood that the form of the invention herewith shown and described is to be taken as a preferred embodiment of same, and that various changes in the shape, size, and arrangement of parts may be resorted to without departing from the spirit of our invention or the scope of the subjoined claims.

We claim:

1. A cargo tiedown and locking device to be used with a web strap or the like to secure cargo in transit comprising a body having opposed side members, each of said side members having a cutout portion and a cam surface provided by said cutout, at least two connecting pins securing said side members together, an operating handle having a forked forward end pivotally secured to said side members substantially above the bottom portion of the cutout and a narrow elongated U-shaped gripping portion having an opening therethrough adjacent said forked end, a hook positioned in said U-shaped gripping portion having an opening in its rear portion registering with the opening in said handle, an elongated pin extending through said openings in said hook and said handle and extending transversely beyond the outer surfaces of said side members, guide means provided by said elongated pin cooperating with said side members to permit movement of said hook by said handle to a forward open position and to a rearward position over said cam surface to seat said elongated pin in said cutout portion in a locked closed position.

2. The structure of claim 1, wherein said guide means is an enlarged end portion provided on both ends of said elongated pin engaging the outer surface of said side members to guide said pin into said cutout portion and to stabilize same in the closed locked position and in the open position.

References Cited in the file of this patent

UNITED STATES PATENTS

| | | |
|---|---|---|
| 323,445 | Pangborn | Aug. 4, 1885 |
| 401,857 | Rogers | Apr. 23, 1889 |
| 2,710,436 | Davis | June 14, 1955 |
| 2,824,717 | Yeager | Feb. 25, 1958 |
| 2,867,406 | Davis | Jan. 6, 1959 |
| 2,980,974 | De Santis | Apr. 25, 1961 |
| 2,997,761 | Davis | Aug. 29, 1961 |